UNITED STATES PATENT OFFICE.

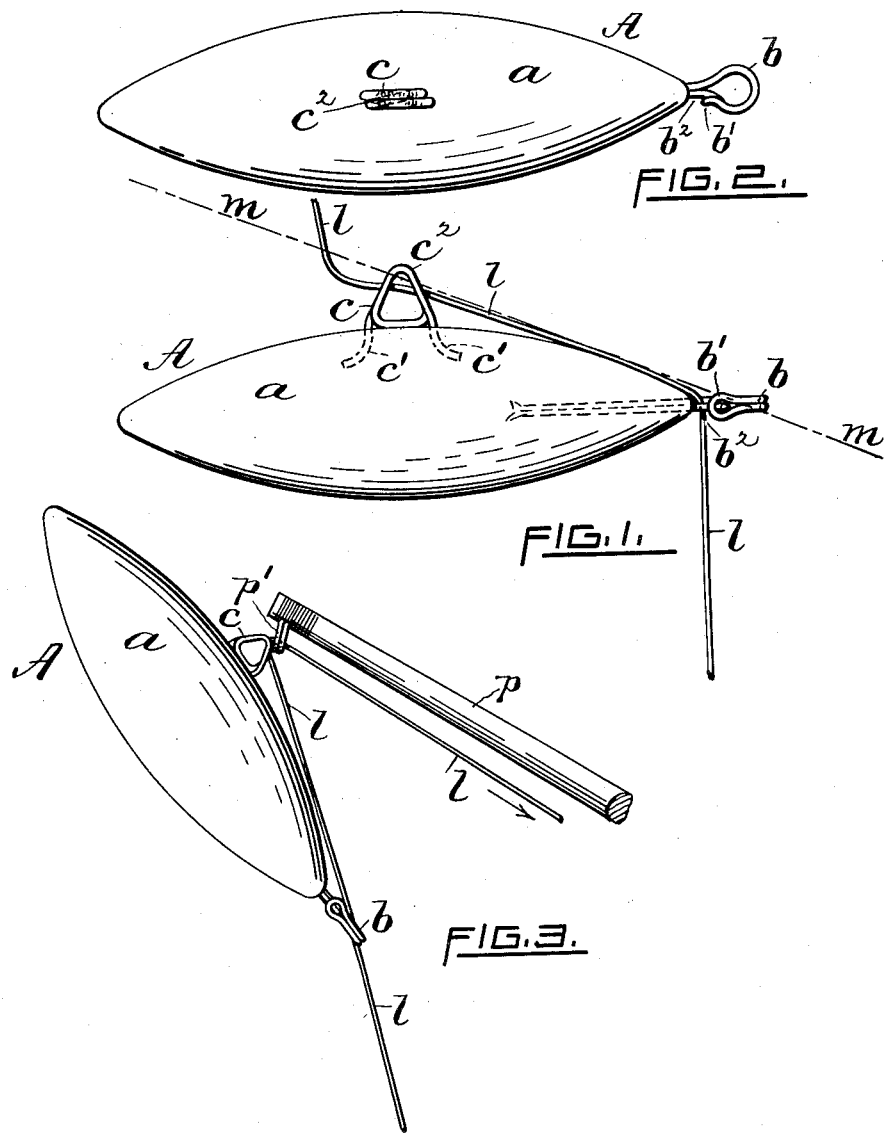

LESLIE M. JOHNSON, OF EAST PROVIDENCE, RHODE ISLAND.

FISHING-FLOAT.

No. 813,153.　　　　　Specification of Letters Patent.　　Patented Feb. 20, 1906.

Application filed August 28, 1905. Serial No. 276,016.

*To all whom it may concern:*

Be it known that I, LESLIE M. JOHNSON, a citizen of the United States of America, and a resident of East Providence, in the county of Providence and State of Rhode Island, have invented certain new and useful Improvements in Fishing-Floats, of which the following is a specification.

My invention relates to certain novel improvements in detachable "fishing-floats," so called; and it consists, essentially, of the float proper having a self-closing eye or line-guide at one end thereof and a spring-clip or yielding tension device secured to the upper side of the float for receiving the line therein, the said eye and clip members being arranged at substantially right angles to each other, all as hereinafter set forth and claimed.

In detachable floats of the class referred to it is usual, in some cases at least, to provide them with eyes or guides to receive the fishing-line therein and hold it in position by friction. In such former floats, however, the construction and arrangement were such that a strain or pull upon the line would disengage it from the clip or holder, thereby causing the fisherman much annoyance, coupled with the loss of time required to readjust the float.

In my improved float the advantages derived do not increase its cost of manufacture. The members of the self-closing guide engage with each other, so as to present a smooth and unobstructed surface to the line, and the latter cannot become accidentally detached from the spring-clip by any pull or tension upon the line—that is to say, the fixed relation or arrangement on the float of the guide to the clip is such that when the line is taut or perfectly straight (or under tension) it is still in positive engagement with the guide and clip, although not touching the periphery of the float proper; but when desired the line may be automatically detached from the clip by reeling in the line until the clip member of the float is brought into engagement with the outer or tip end of the pole, at which instant the continued reeling tension upon the line forcibly withdraws the latter from the spring-clip, the float then dropping down the line to the water or to the sinker or hook, and is arrested by the comparatively small eye or guide.

In the accompanying sheet of drawings, Figure 1 is a side elevation of a fishing-float embodying my improvements. Fig. 2 is a corresponding plan view; and Fig. 3 is a side view, showing the position of the line and float when the line is being automatically detached from the spring-clip or holder.

In the drawings, A designates my improved float as a whole. To one end (when in use being the rear or lower end) of the body member $a$ of the float and extending along the longitudinal axis thereof is permanently secured a wire eye or guide $b$, forming a smooth spring hook or ring, one end $b'$ being bent to receive the yielding fellow member or keeper $b^2$, which closes the entrance to the eye. It will be seen that the free end of the part $b^2$ is concealed and protected in the bent portion $b'$, thereby producing a perfectly smooth and unobstructed opening for the line. (See Fig. 2.)

$c$ designates a spring-clip made from a piece of suitable wire bent to form practically two vertically-arranged convolutions located side by side and terminating in the two downwardly-extending attaching-prongs $c'$. I prefer to position the clip on the upper exterior side and near the center of the float $a$, the top or holding portion $c^2$ of the clip extending, say, above an imaginary line $m$ drawn through the eye $b$ and the clip and being tangent to the periphery of the float. (See Fig. 1.)

It will be seen that as drawn the eye member $b$ is arranged in a horizontal plane, the clip $c$ being in a vertical plane and at substantially right angles to each other. In Fig. 1 the normal position of the float and fishing-line $l$ are represented. In the event of a pull or tension upon the line the float may thereby be tipped to an angle until in an extreme case the line is perfectly straight or as indicated by the broken line $m$. In order to free the clip portion of the float from the line, the latter is withdrawn from between the adjacent yielding sides or coils $c^2$. When in use, however, this is automatically effected, Fig. 3, by reeling the line $l$ in the arrow direction until the clip forcibly engages the end $p'$ of the pole-tip $p$, the result being to withdraw the line from the clip, substantially as just stated. It is obvious that the line may be readily inserted into or detached from the guide $b$ by simply pressing the member $b^2$ rearwardly to uncover the opening for the passage of the line.

I claim as my invention and desire to secure by United States Letters Patent—

1. As an improved article of manufacture, a fishing-float comprising an ellipsoidal body member *a*, an eye or line-guide mounted in one end thereof and a peripheral spring-clip secured to said body and located substantially midway of it, the jaws or yielding sides of said clip member being parallel with the longitudinal axis of the body and extending perpendicularly above the latter, the upper portion of the clip and the outer end of the eye member being in alinement with each other and with a point in the intermediate peripheral surface of the body, substantially as shown and described.

2. The fishing-float A herein described, consisting of the ellipsoidal-shaped body member *a*, the self-closing hook or line-guide *b* rigidly secured in one end of said body, and the clip *c* having parallel yielding sides, said clip being secured to the body member and projecting radially from the surface thereof at its maximum transverse diameter, the top or free end of the clip being in alinement with said guide *b* and having that portion of the surface of the body lying between said guide and clip members substantially below a straight line passing through said members.

3. A fishing-float comprising an ellipsoidal-shaped body *a*, an eye member secured in the center of one end of the body, and a spring-clip rigidly secured to and located centrally of the length of the latter and projecting upwardly or outwardly therefrom; the length of the clip being such that its upper or free end is adapted to intersect a straight line passing through said eye and being tangent to the adjacent surface of the body, substantially as described.

Signed at Providence, Rhode Island, this 26th day of August, 1905.

LESLIE M. JOHNSON.

Witnesses:
GEO. H. REMINGTON,
A. P. COBB.